March 15, 1927.

C. E. F. AHLM 1,620,857

TRANSMISSION GEARING

Filed Dec. 30, 1924　　　2 Sheets-Sheet 2

INVENTOR
Charles E. F. Ahlm
By Bates, Macklin,
Goldrick & Teare
ATTORNEYS

Patented Mar. 15, 1927.

1,620,857

UNITED STATES PATENT OFFICE.

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed December 30, 1924. Serial No. 758,943.

This invention relates to change speed transmission gearing such as used for example in automobile transmission to secure different speeds and a reverse drive between the motor and the rear axle or propeller shaft.

The gearing employs the general principles set out in my copending application, filed December 30, 1924, Serial No. 758,940, which shows, describes and claims a gearing connection between driving and driven members including an eccentrically mounted internal-external gear meshing internally with a pinion which is connected to one of the members, and externally with a gear rigid with the other. The internal-external gear is mounted on a rotatable eccentric bearing and the invention includes means for connecting one of the rotating members, the driving member as shown in that case, to the eccentric bearing for preventing relative rotation between the internal-external gear and the eccentric and thus preventing any speed reduction between the driving and the driven members. In common with the earlier application the present invention also includes brake operated means for holding the eccentric bearing rigid with the casing for a reduced speed, and also for retarding the rotation of the internal-external gear while permitting it to revolve about the eccentric for imparting a reverse rotation to the driven member. The present application is principally distinguished from the earlier application in the manner of connecting the members for direct drive. In this instance a dental clutch is employed for directly connecting the eccentric to the driven member. The particular object of this invention therefore, is to provide a gearing mechanism employing an internal-external rotating and revolving gear mounted on an eccentric bearing in which the bearing may be held against rotation relative to the driving and driven members or may be positively connected with one of them for effecting simultaneous rotation between the driving and driven members. A more general object may be stated to include the provision of a simplified form of change speed gearing of the type herein shown.

The manner in which the above objects are attained will become more apparent from the further description of my invention with reference to the accompanying drawings.

The essential characteristics will be summarized in the claims.

Figure 1:
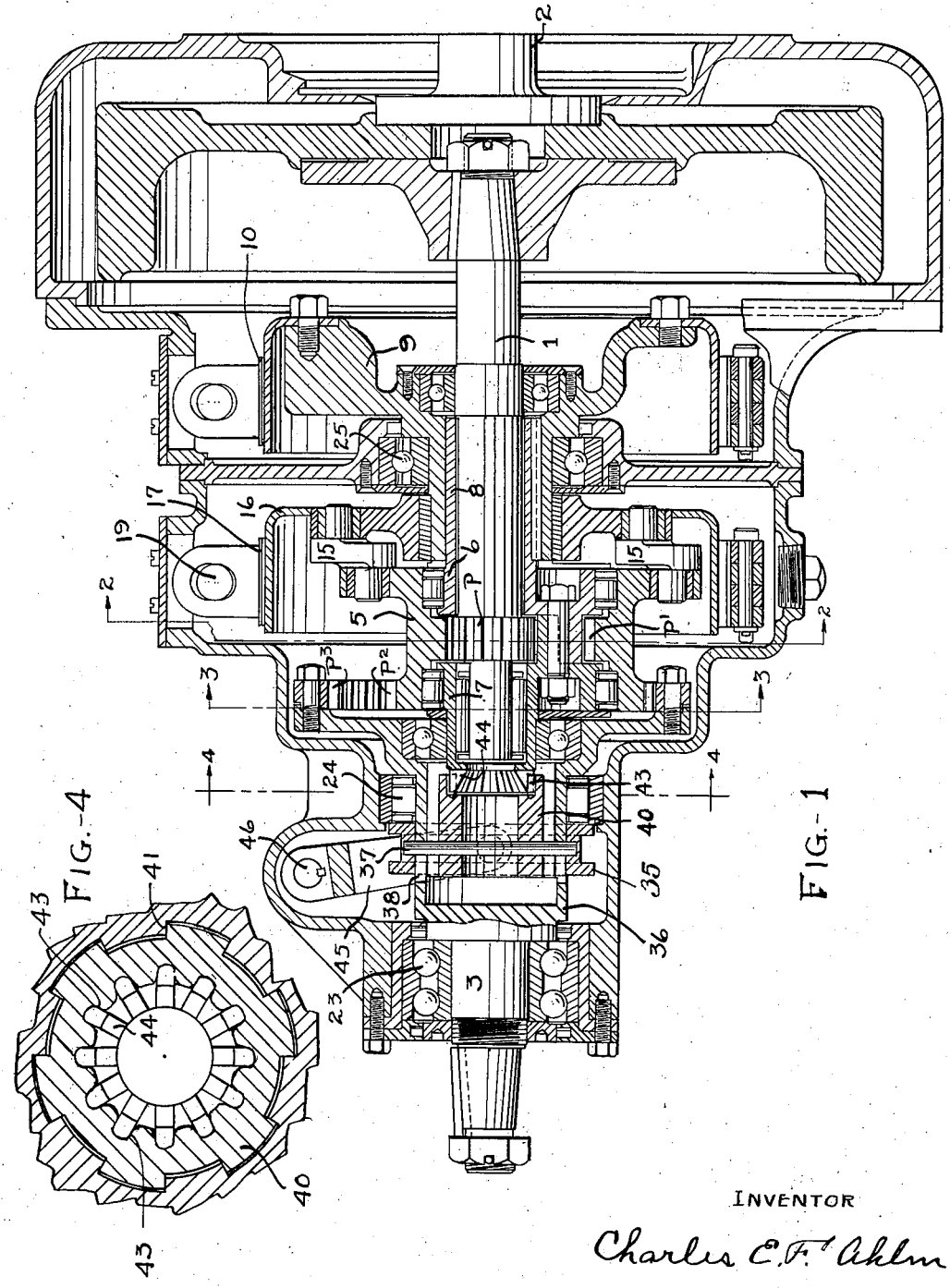
Figure 2:
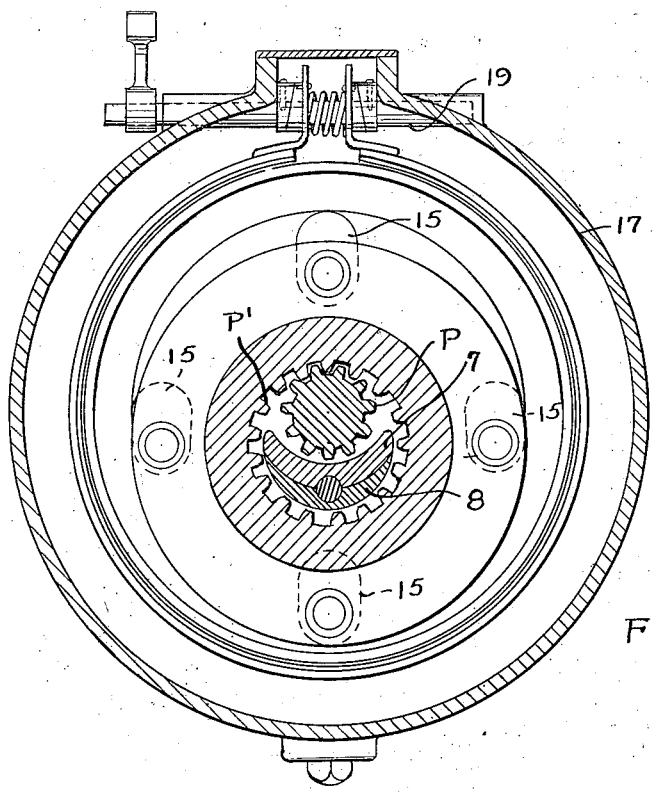
Figure 3:
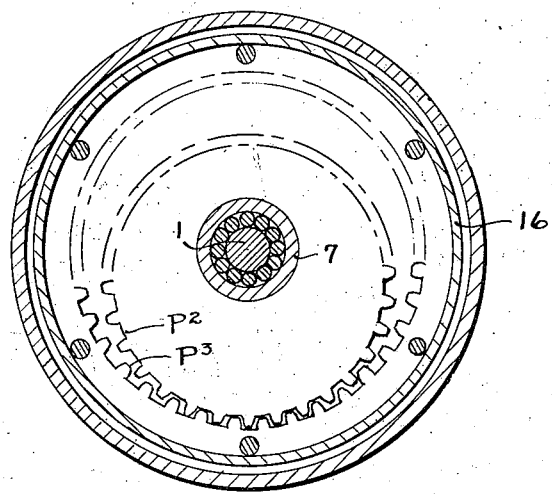

In the drawings Fig. 1 is a substantially axial section through the preferred form of my gearing; Fig. 2 is a transverse section therethrough taken on the lines 2—2 of Fig. 1; Fig. 3 is a similar section taken on the lines 3—3 of Fig. 1; Fig. 4 is a fragmentary section of my clutching member taken along the lines 4—4 on Fig. 1.

Designating the various parts by the use of reference characters, I have shown a driving shaft 1 adapted to be connected to an engine shaft 2 which is mounted in suitable bearing and is arranged to be connected to a driven member 3. The driving shaft is shown as carrying pinion teeth $P$ connected with teeth $P^1$ of an internal gear rigid on a composite gear member 5. The composite gear member is carried by an eccentric bearing 6 shown as surrounding the shaft at either side of the pinion and may be made in two tubular sections 7 and 8. The portion 8 is shown connected to a braking member 9 suitably counterweighted to balance the eccentric and composite gear which brake may be operated upon by a brake 10 shown secured in the casing. Means such as cranks 15 connected at one end to the gear member 5 and at the other to a brake member 16 may serve to hold the internal-external gear against rotation when it is desired to effect a reverse drive of the propeller shaft. The brake member 16 has a cooperating brake member 17 operable as shown in Fig. 2 from a shaft 19 journaled in the casing. The internal-external gear carries gear teeth $P^2$ which connect with teeth $P^3$ carried by the driven member 3. Suitable anti-friction bearings are provided between all of these relatively rotating members which in the embodiment shown are finally supported by rollers 23, 24 and 25 in the casing.

It is apparent that when the eccentric bearing is held against rotation by the operation of a brake 10 and the engine or driving shaft rotated, at a certain speed, the internal-external gear will be rotated at a less speed due to the reduction between the gears $P$ and $P^1$, while the propeller shaft will be rotated at a still less speed due to the reduction between the gears $P^2$ and $P^3$. For another speed the brake member 16 is held against rotation preventing the rotation of the internal external gear 5 yet permitting it to revolve about the eccentric, which would necessarily be then left free to rotate, to take up the reaction of the force imparted by the gear teeth against the teeth P¹ tending to rotate the eccentrically mounted gear member 5. The revolving movement of this gear member 5 is permitted by reason of the cranks being offset a distance corresponding to the eccentricity of the bearing 6 and in this revolving movement the gear teeth P² impart a slow reverse rotation to the gear P³ resulting in a condition of reverse drive between the driving member and the propeller shaft.

It is within the spirit of this invention to substitute other means such as gears of different diameters in place of the crank 15 as well as changing the relation between the gear P² and P³ as for instance in connecting the gear P² an internal gear and the gear P³ an external gear depending on whatever speed may be desired.

The means by which I attain a third speed namely, synchronous rotation of the driving and driven shaft is as stated the primary distinguishing feature of this application and consists essentially in clutching the propeller member directly to the eccentric bearing. To this end I may employ a clutch collar 35 rigid with a tubular portion 36 of the propeller member by reason of a pin 37 extending through the tubular portion by way of slots 38 therein. The pin also extends into a substantially cylindrical member 40 preferably splined as shown in Fig. 4 to the interior of the tubular portion 36 of the propeller as at 41. The member 40 preferably carries clutch teeth such as shown at 43 which are adapted to mesh with similar teeth 44 carried by the rearward end of the eccentric member 7. Means for shifting the collar 35 may comprise an arm 45 suitably mounted on a shaft 46 and journaled in the casing in the usual manner.

It will be easily seen that if the eccentric bearing is held rigid with either the composite gear, the propeller shaft or with the driving shaft the same result will obtain. However by the arrangement shown in the present application the mechanism is somewhat simplified. The two braking members 9 and 16 for instance are placed closer together resulting in a saving of metal composing the casing, while the mechanism which effects direct drive is made to take up considerably less lateral space than if for instance the holding member 16 were connected to the bearing.

In the proportions shown the speeds which may be had are as follows: Assuming an engine speed of 600 R. P. M. when the propeller shaft is clutched to the eccentric bearing thus preventing any relative rotation between the internal-external gear and either the propeller shaft or driving shaft the propeller shaft is of course also rotated at 600 R. P. M.

If the diameter of the pinion P is assumed to be 1.4 diameter of the circle of rotation of the axis of the eccentric 5 is 1, gear P¹ is 2.4, gear P² is 3.5, and the propeller or gear P³ is 4.5; then when the eccentric bearing is held against rotation by clamping the brake member 9 and the composite gear simply rotates on its eccentric bearing the speed of the propeller is found to be 450.2. If the composite gear is prevented from rotating but permitted to revolve (following the free rotation of its bearing) a reverse speed of about 180 is obtained for the propeller gear P³.

It will be seen that I have provided a very simple mechanism for attaining the outlined objects. I am aware that changes may be made in the construction to still attain the desired results and therefore I do not wish to limit the scope of my invention to inessential details of construction.

Having thus described my invention, I claim:

1. In a gearing, in combination, a driving member having a pinion, a composite gear member in mesh with said pinion, an eccentric bearing for said gear member capable of independent and synchronous rotation relative to the driving member and of being held stationary, a driven member having a geared connection with said composite gear, means for retarding the rotation of said composite gear while permitting it to revolve upon the eccentric bearing when the bearing is free to rotate for transmitting one speed to the driven member, means for holding the eccentric bearing against rotation for an additional speed and means for connecting the eccentric bearing directly to the driven member for effecting a third speed.

2. In a transmission gearing, in combination, a shaft having a gear member rigid therewith, a rotatable eccentric bearing surrounding a portion of the shaft and carrying clutch teeth, releasable means for controlling the rotation of the eccentric, a rotatable and revoluble composite gear mounted on said eccentric bearing and having one set of teeth meshing with said gear member of the shaft, means for restraining the rotation of said composite gear when said bearing is free to rotate, another shaft having a geared connection with the composite gear, a clutch member carried by said last named shaft arranged to cooperate with the clutch teeth of the bearing, and means for bringing the clutch teeth together whereby the shafts may be synchronously rotated.

3. In a transmission gearing, in combination a driving member, a driven member, a rotatable and revoluble composite gear member in offset axial relation to one of said members and having a geared connection with both the driving and driven members, a bearing for said gear member capable of free rotation, means for controlling and stopping the rotation of the bearing for imparting a reduced speed to the driven member through said gear members, means for restraining the movement of the composite gear when the bearing is free to rotate for securing a second speed relation, and means for effecting a positive direct connection between the driven member and the eccentric bearing, when the eccentric bearing is free to rotate, to secure synchronous rotation between the driving and driven members.

4. In a transmission gearing, in combination a driving member, and a gear drivingly connected therewith, an eccentric bearing member surrounding a portion of the driving member, a rotatable and revoluble internal-external gear mounted on said bearing having teeth in mesh with the gear of the driving member, a driven member and a gear drivingly connected therewith in mesh with said internal-external gear, means for retarding the rotating movement of the internal-external gear while permitting the revolution thereof for effecting a reverse rotation of the driven member, a clutch member, rigid with said driven member a cooperating clutch member rigid with the eccentric bearing and means for operating the clutch whereby the driving and driven members may be synchronously rotated.

5. In a gearing of the class described, an internal-exterial reduction gear, an eccentric bearing for supporting said gear, a driving member having a geared connection with internal teeth of the internal-external gear, a hollow driven member having internal gear teeth formed thereon, in mesh with the external teeth of the internal-external gear, a dental clutch member carried interiorly of said driven member and rigid therewith, a clutch member rigid with said eccentric bearing and means for shifting one of said clutch members whereby the reduction gearing is made to rotate idly while the driving and driven members are synchronously rotated.

6. In a gearing, in combination, a driving member having a pinion, a composite gear member in mesh with said pinion, an eccentric bearing member for said gear member arranged to rotate or to be held relatively stationary, a driven member having a geared connection to said composite gear, brake operated means for holding the eccentric bearing against rotation for imparting a reduced speed to said driven member, means for retarding the rotation of said composite gear while permitting it to revolve upon the eccentric bearing when the bearing is free to rotate for effecting revers rotation of the driven member, and a dental clutch for connecting the eccentric bearing to the driven member for effecting synchronous rotation between the driving and driven members.

7. In a gearing, in combination, a shaft having a pinion, a hollow bearing member surrounding the shaft and having an eccentric portion, a composite gear member mounted on the eccentric portion and having internal teeth in mesh with the pinion, a rotatable member having teeth in mesh with a second set of gear teeth of the composite gear, said rotatable member having a clutch member mounted interiorly thereof, a cooperating clutch member mounted on one end of the eccentric bearing and means for bringing the clutch members together to drivingly couple the bearing to said rotatable member for a given speed, a wheel having a counterweight for balancing the eccentric portion and mounted on the other end of the bearing member, and means cooperating with said wheel to control the rotation of the bearing for another speed.

8. In a gearing, a shaft having a pinion, a bearing member surrounding a portion of said shaft, an internal-external gear carried by the bearing and having teeth in mesh with the pinion, a hollow rotatable member having a gear rigid therewith engaging the external teeth of the internal-external gear, a bearing for the rotatable member, a rolling bearing carried by the rotatable member for supporting one end of the eccentric bearing, and rolling bearings carried by the eccentric bearing for supporting one end of the shaft, clutch means rigid with the eccentric bearing and cooperating clutch means slidably mounted within the hollow rotatable member cooperating therewith to cause the clutch members to engage, for securing synchronous rotation between all the rotatable elements.

9. In combination, a hollow rotatable member having separated rolling bearings, a clutch element within said hollow member, means located between the bearings for operating the same, an eccentric bearing having a cooperating clutch element, a shaft, said shaft and bearing member having rolling bearings, one being carried directly by the hollow member, a pinion on the shaft, a composite gear member carried by the eccentric bearing and engaging the pinion, a gear carried by the hollow member engaging the composite gear, means for controlling the rotation of the bearing when said clutch elements are disconnected for effecting a given speed relation between the shaft and rotatable member, and means for controlling the rotation of the gear for another relation.

10. In a gearing of the class described, a hollow rotatable member, supporting bearings therefor, a shaft having a pinion, a hollow bearing member surrounding the shaft, a composite gear member carried by the bearing member having teeth in mesh with the pinion, a gear rigid with the first named hollow member having teeth in mesh with the composite gear, a rolling bearing interposed between the eccentric bearing member and the said first named hollow member and rolling bearings between the eccentric bearing and the shaft whereby a portion of the shaft and hollow bearing are both supported by said first named hollow member, means for controlling the rotation of the eccentric bearing and composite gear whereby the gearing operates to secure a plurality of speeds between the shaft and said first named hollow member, a clutch member carried by a forwardly projecting portion of the eccentric bearing, said portion extending between said rolling bearings and a cooperating clutch member within said rotatable member whereby direct drive may be secured between the shaft and said hollow member.

11. In a transmission gearing, a shaft having a pinion, a rotatable eccentric bearing surrounding a portion of the shaft, a clutch member carried thereby extending rearwardly of the shaft, releasable means for controlling the rotation of the eccentric, a composite gear mounted on said eccentric bearing and having one set of teeth meshing with the pinion, a rotatable member having rolling bearings for supporting the rearward end of the eccentric bearing and having a gear in mesh with said composite gear, a clutch member cooperating with said first named clutch member and rigid with said rotatable member, and means for causing such cooperation to couple the eccentric bearing to the rotatable member to cause all of the elements to be rotated as a unit.

12. In a transmission gearing in combination a pair of rotatable members to be connected in different speed relations, a rotatable and revoluble composite gear member in offset axial relation thereto and having a geared connection with each of the rotatable members, independently rotatable means and means for restraining such independent rotation, and a connection between such independently rotatable means and the composite gear including a plurality of cranks having bearings for their arms carried rigidly by the last named means and the composite gear respectively, an independently rotatable bearing member for the composite gear adapted to rotate freely when said restraining means is operative for effecting a given speed relation between the first named members, and means for causing the bearing member to be effectively locked to one of the first named members for another speed.

13. In a transmission gearing, in combination, a pair of rotatable members to be connected in different speed relations, an independently rotatable bearing member in surrounding relation to one of said members, a rotatable and revoluble internal-external gear member mounted thereon and having a geared connection with each of the rotatable members, independently rotatable means having a connection therewith and means for restraining such independent rotation, said connection comprising cranks, having their arms supported by said independently rotatable means and the internal-external gear respectively, for restraining the rotation of the internal-external gear, and clutch means for connecting the bearing member to one of said first named rotatable members.

14. In a transmission gearing, a pair of rotatable members, a rotatable eccentric bearing surrounding one of the members, a composite gear member surrounding the bearing having a geared connection with both of said rotatable members, an independently rotatable member and a connection between it and the composite gear comprising crank members with their respective arms pivotally engaging the independently rotatable member and gear, means for restraining the rotation of the last named member for a given speed, and means for controlling the rotation of the eccentric bearing for another speed.

15. In a gearing, a pair of rotatable members, gears rigid with each, a composite gear in mesh with both of said gears, a rotatable bearing member supporting the same, said bearing member surrounding one of the rotatable members and being capable of independent rotation relative thereto, means for restraining the rotation of the composite gear comprising a member and cranks pivotally supported thereby, said cranks also having pivot supports rigid with the composite gear, and means for preventing relative rotation between the bearing member and rotatable members whereby these elements may rotate in unison.

16. In a transmission gearing, in combination, a pair of rotatable members to be connected in different speed relations, an independently rotatable bearing member in surrounding relation to one of said members, a rotatable and revoluble composite gear member mounted thereon and having a geared connection with each of the rotatable members, restraining means for the composite gear comprising a restrainable member and cranks connecting the same to the gear to prevent its rotation relative to the restrainable member, means for holding the eccentric gear against rotation for a given speed and means for effectively locking all the elements together whereby they may rotate as a unit.

In testimony whereof, I hereunto affix my signature.

CHARLES E. F. AHLM.